(12) United States Patent
Madi et al.

(10) Patent No.: US 11,698,008 B2
(45) Date of Patent: Jul. 11, 2023

(54) EXHAUST DEVICE

(71) Applicant: Tenneco Automotive Operating Company Inc., Lake Forest, IL (US)

(72) Inventors: Abdulhadi Madi, East Lansing, MI (US); Jason C. Johnson, Brighton, MI (US); Manoj Kumar Sampath, Ann Arbor, MI (US); Prajwal Hanumantha Rao, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 635 days.

(21) Appl. No.: 16/791,056

(22) Filed: Feb. 14, 2020

(65) Prior Publication Data

US 2020/0182111 A1 Jun. 11, 2020

(51) Int. Cl.
  *F01N 1/02* (2006.01)
  *F01N 3/28* (2006.01)
  (Continued)

(52) U.S. Cl.
  CPC .............. *F01N 1/023* (2013.01); *F01N 1/04* (2013.01); *F01N 3/2803* (2013.01);
  (Continued)

(58) Field of Classification Search
  CPC . F01N 1/023; F01N 1/026; F01N 1/04; F01N 3/2803; F01N 3/2853;
  (Continued)

(56) References Cited

U.S. PATENT DOCUMENTS

| | | | |
|---|---|---|---|
| 1,683,084 A | 9/1928 | Mackenzie et al. |
| 2,834,425 A | 5/1958 | Emanuel |

(Continued)

FOREIGN PATENT DOCUMENTS

| | | |
|---|---|---|
| CN | 201110210 | 9/2008 |
| CN | 205445758 | 8/2016 |

(Continued)

OTHER PUBLICATIONS

English translation of JP-2008240587-A, accessed Aug. 18, 2022 from search tool. (Year: 2008).*

(Continued)

*Primary Examiner* — Jeremy A Luks
(74) *Attorney, Agent, or Firm* — McGarry Bair PC (57) ABSTRACT

An exhaust device (108) for a vehicle is provided. The exhaust device (108) includes an outer shell (202), an inlet (206) to receive exhaust gases, an outlet (208), an inner shell (204) received within the outer shell (202), a pair of partition walls (216) and a Helmholtz neck (220). The inner shell (204) defines an inner volume (210). A plurality of first circumferential openings (212) extending through the inner shell (204) fluidly communicates the inlet (206) with the inner volume (210). A plurality of second circumferential openings (214) extending through the inner shell (204) fluidly communicates the outlet (208) with the inner volume (210). The pair of partition walls (216) is disposed between the inner shell (204) and the outer shell (202). The pair of partition walls (216), the inner shell (204) and the outer shell (202) define a Helmholtz chamber (218) therebetween. The partition walls (216) seal the Helmholtz chamber (218) from the inlet (206) and the outlet (208). The Helmholtz neck (220) is disposed on the inner shell (204) or one of the pair of partition walls (216).

17 Claims, 12 Drawing Sheets

(51) Int. Cl.
  *G10K 11/172*  (2006.01)
  *G10K 11/162*  (2006.01)
  *F01N 1/04*    (2006.01)

(52) U.S. Cl.
  CPC .......... *F01N 3/2853* (2013.01); *G10K 11/162* (2013.01); *G10K 11/172* (2013.01); *F01N 2230/04* (2013.01)

(58) Field of Classification Search
  CPC ............. F01N 2230/04; F01N 2470/02; F01N 2470/18; F01N 2470/24; G10K 11/162; G10K 11/172
  See application file for complete search history.

(56) References Cited

U.S. PATENT DOCUMENTS

| | | | |
|---|---|---|---|
| 3,176,791 A | | 4/1965 | Betts et al. |
| 3,434,565 A | * | 3/1969 | Fischer ................... F01N 1/023 181/250 |
| 3,920,095 A | * | 11/1975 | Clark ...................... F16L 55/02 181/248 |
| 4,073,361 A | | 2/1978 | Murota et al. |
| 4,501,341 A | * | 2/1985 | Jones ........................ F01N 1/02 181/272 |
| 5,808,245 A | * | 9/1998 | Wiese ...................... F01N 3/005 60/299 |
| 7,273,129 B2 | | 9/2007 | Harwood |
| 7,347,044 B1 | * | 3/2008 | Lubenow ................ F01N 3/005 60/309 |
| 8,181,446 B2 | | 5/2012 | Honda et al. |
| 8,568,661 B2 | | 10/2013 | Werni et al. |
| 8,695,330 B2 | | 4/2014 | Davidson et al. |
| 9,140,174 B2 | | 9/2015 | Wikaryasz et al. |
| 9,222,392 B2 | | 12/2015 | Schwarz et al. |
| 10,408,110 B2 | | 9/2019 | Johnson et al. |
| 10,450,911 B2 | * | 10/2019 | Döring ...................... F01N 1/02 |
| 2006/0277900 A1 | * | 12/2006 | Hovda ................ F01N 13/1844 60/299 |
| 2007/0137188 A1 | * | 6/2007 | Ohya .................... F01N 3/0222 60/297 |
| 2011/0088968 A1 | * | 4/2011 | Kempf .................... F01N 1/026 181/250 |
| 2011/0203692 A1 | * | 8/2011 | Werni ................... F01N 3/2853 138/37 |
| 2012/0134889 A1 | * | 5/2012 | Freis ..................... F01N 3/2867 29/700 |
| 2015/0240692 A1 | * | 8/2015 | De Rudder .......... F01N 3/0842 422/168 |
| 2017/0276043 A1 | * | 9/2017 | Khan .................... F01N 3/0335 |
| 2019/0093528 A1 | | 3/2019 | Egan et al. |
| 2020/0173320 A1 | | 6/2020 | Lagier et al. |

FOREIGN PATENT DOCUMENTS

| | | | | |
|---|---|---|---|---|
| DE | 102008031136 | | 1/2010 | |
| DE | 10353594 | | 8/2013 | |
| EP | 0779415 A1 | * | 11/1996 | |
| EP | 3688289 A1 | | 8/2020 | |
| FR | 2713702 | | 3/1996 | |
| GB | 2558311 | | 7/2018 | |
| JP | 2719933 | | 2/1998 | |
| JP | 2008240586 A | * | 10/2008 | |
| JP | 2008240587 A | * | 10/2008 | |
| JP | 5180656 | | 1/2013 | |
| KR | 101601327 | | 3/2016 | |
| WO | WO-02077425 A1 | * | 10/2002 | ............ F01N 1/089 |
| WO | 2019059942 A1 | | 3/2019 | |

OTHER PUBLICATIONS

English translation of JP-2008240586-A, accessed Aug. 18, 2022 from search tool. (Year: 2008).*

* cited by examiner

EXHAUST DEVICE

TECHNICAL FIELD

The present disclosure relates to an exhaust device, and in particular to an exhaust device for a vehicle.

BACKGROUND

Single shell exhaust devices or mufflers are commonly used in vehicle exhaust systems. Some muffler designs also utilize double exhaust wraps. Two layers of material in the double wrap remain in contact. A lock seam may have to formed in such designs. However, there may be manufacturing challenges related to the formation of lock seams. Different thermal expansion of the two layers during operation may adversely impact noise attenuation performance. Further, as the double wrap is applied to an entire length of the exhaust device, it may add unnecessary weight and cost in the overall manufacturing method.

Further, for most exhaust devices including aftertreatment components, it may be challenging to keep packaging length within required space constraints. Exhaust devices typically include an inlet can design near an exhaust inlet. Inlet can designs generally have fish mouth inlet entry and include a flow improvement device to improve flow distribution. By adding flow improvement devices (such as, baffles or perforated tubes), the inlet can volume may be increased. Consequently, an overall system length of the exhaust device may be increased.

SUMMARY

According to a first aspect there is provided an exhaust device for a vehicle. The exhaust device includes an outer shell, an inlet extending from the outer shell to receive exhaust gas, an outlet extending from the outer shell, an inner shell received within the outer shell, a pair of partition walls and a Helmholtz neck. The inner shell defines an inner volume. The inner shell further defines a plurality of first circumferential openings therethrough fluidly communicating the inlet with the inner volume. The inner shell further defines a plurality of second circumferential openings therethrough fluidly communicating the outlet with the inner volume. The pair of partition walls is disposed between the inner shell and the outer shell. The pair of partition walls, the inner shell and the outer shell define a Helmholtz chamber therebetween. The partition walls seal the Helmholtz chamber from the inlet and the outlet. The Helmholtz neck is disposed on the inner shell or one of the pair of partition walls. The Helmholtz neck fluidly communicates the inner volume with the Helmholtz chamber. The inner shell is radially offset from the outer shell by an annular gap.

According to a second aspect there is provided an exhaust device for a vehicle. The exhaust device includes an outer shell, an inlet extending from the outer shell to receive exhaust gas, an outlet extending from the outer shell, an inner shell received within the outer shell, a pair of partition walls and a Helmholtz neck. The inner shell defines a first opening, a second opening and an inner volume. The first opening is disposed in fluid communication with the inlet. The second opening is disposed in fluid communication with the outlet. The inner volume extends between the first opening and the second opening. The pair of partition walls is disposed between the inner shell and the outer shell. The pair of partition walls, the inner shell and the outer shell define a Helmholtz chamber therebetween. The pair of partition walls seal the Helmholtz chamber from the inlet and the outlet. The Helmholtz neck is disposed on the inner shell or one of the pair of partition walls. The Helmholtz neck fluidly communicates the inner volume with the Helmholtz chamber. The inner shell is radially offset from the outer shell by an annular gap.

In yet another aspect of the disclosure, an exhaust device for a vehicle is provided. The exhaust device includes an outer shell, an inlet extending from the outer shell to receive exhaust gas, an outlet extending from the outer shell, an inner shell received within the outer shell and an end cap. The inner shell defines at least one first opening, at least one second opening and an inner volume. The first opening is disposed in fluid communication with the inlet. The second opening is disposed in fluid communication with the outlet. The inner volume extends between the first opening and the second opening. The end cap is connected to the outer shell and seals the first opening. Further, the end cap includes a shoulder to support the inner shell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
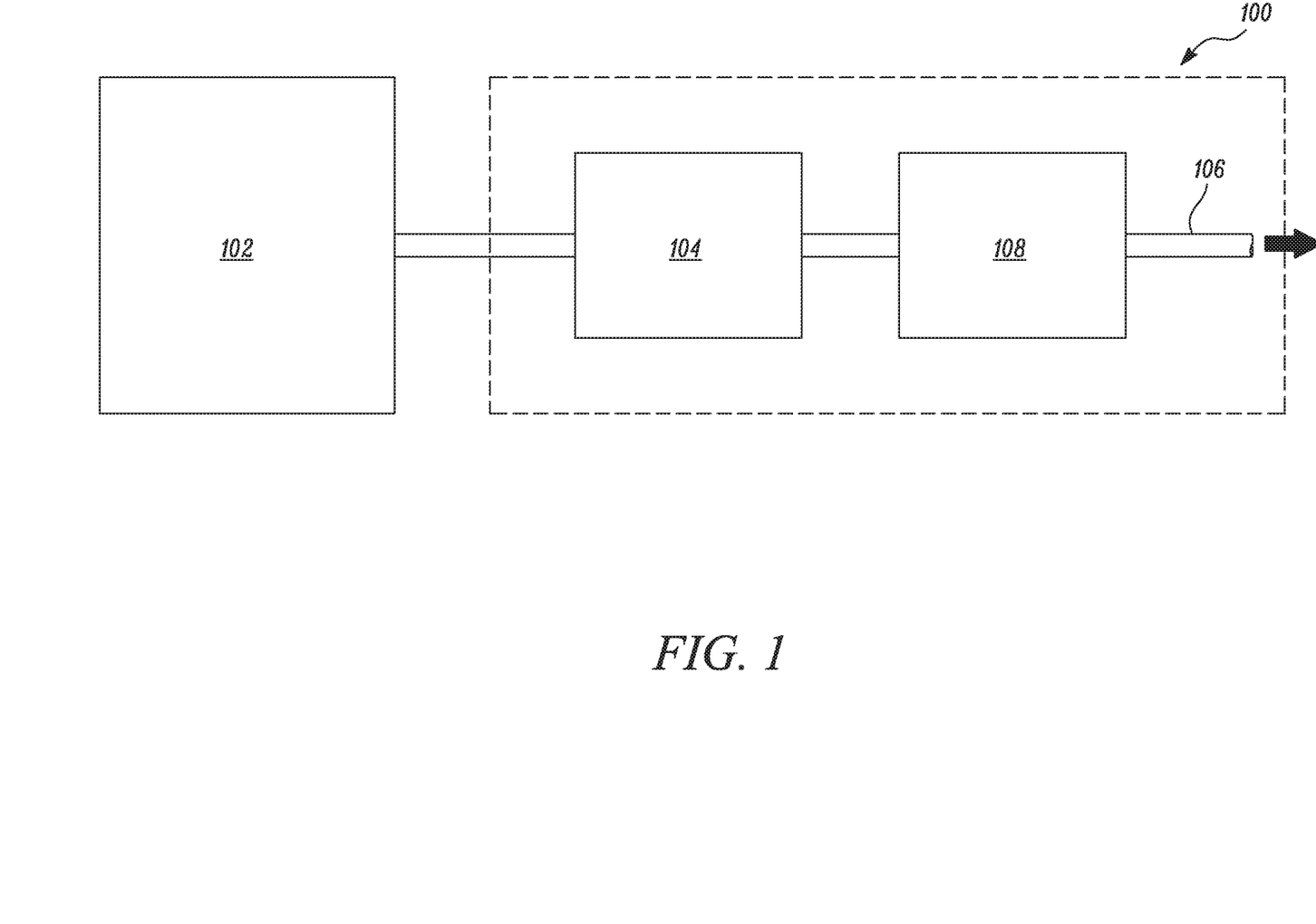
FIG. 1 is a schematic representation of a vehicle exhaust system, according to an aspect of the present disclosure.

The following description of the preferred embodiment(s) is merely exemplary in nature and is in no way intended to limit the invention, its application, or uses. Referring now to the drawings in which like reference numerals designate like or corresponding parts throughout the several views, there as shown in FIG. 1. Referring to FIG. 1, a schematic representation of a vehicle exhaust system 100 is illustrated. The vehicle exhaust system 100 will be hereinafter interchangeably referred to as the "system 100". The system 100 is fluidly coupled to an engine 102. The engine 102 can be any internal combustion engine powered by a fuel, such as diesel, gasoline, natural gas, and/or a combination thereof. Accordingly, the system 100 receives exhaust gas generated by the engine 102.

The system 100 includes a number of downstream exhaust components 104 fluidly coupled to the engine 102. The exhaust components 104 can include a number of systems/components (not shown), such as a Diesel Oxidation Catalyst (DOC), a Diesel Exhaust Fluid (DEF) unit, a Selective Catalytic Reduction (SCR) unit, a particulate filter, an exhaust pipe, an active valve, a passive valve, Exhaust Gas Heat Recovery System (EGHR) and the like. The exhaust components 104 can be mounted in various different configurations and combinations based on application requirements and/or available packaging space. The exhaust components 104 are adapted to receive the exhaust gas from the engine 102 and direct the exhaust gas to the external atmosphere via a tailpipe 106. The exhaust components 104 are adapted to reduce emissions and control noise, and can also be used for thermal management.

In another embodiment, the engine 102 can be part of a hybrid system, i.e., the engine 102 can be operatively coupled with an electric motor and a battery. Further, the exhaust components 104 of the system 100 can be operational only when the engine 102 is burning fuel and not operational when the engine 102 is not running.

The system 100 also includes an exhaust device 108 provided in fluid communication with the exhaust components 104 and the tailpipe 106. In some embodiments, the exhaust device 108 is an acoustic damping exhaust device 108, such as a muffler. In some other embodiments, the exhaust device 108 may alternatively or additionally perform exhaust treatment functions. In the illustrated embodiment, the exhaust device 108 is disposed downstream of the exhaust components 104 and upstream of the tailpipe 106. In other embodiments, the exhaust device 108 can be disposed in any sequence with respect to each of the exhaust components 104 and/or the tailpipe 106, based on application requirements. In some cases, the exhaust device 108 is adapted to dampen resonance frequencies generated during operation of the engine 102 and the system 100. In some embodiments, the exhaust device 108 may include catalyst substrates for exhaust gas purification in addition to exhaust gas noise attenuation. In another embodiment, the system 100 may include hybrid design that combines the exhaust components 104 and the exhaust device 108 to include both emissions and acoustics tuning elements.

Figure 2:
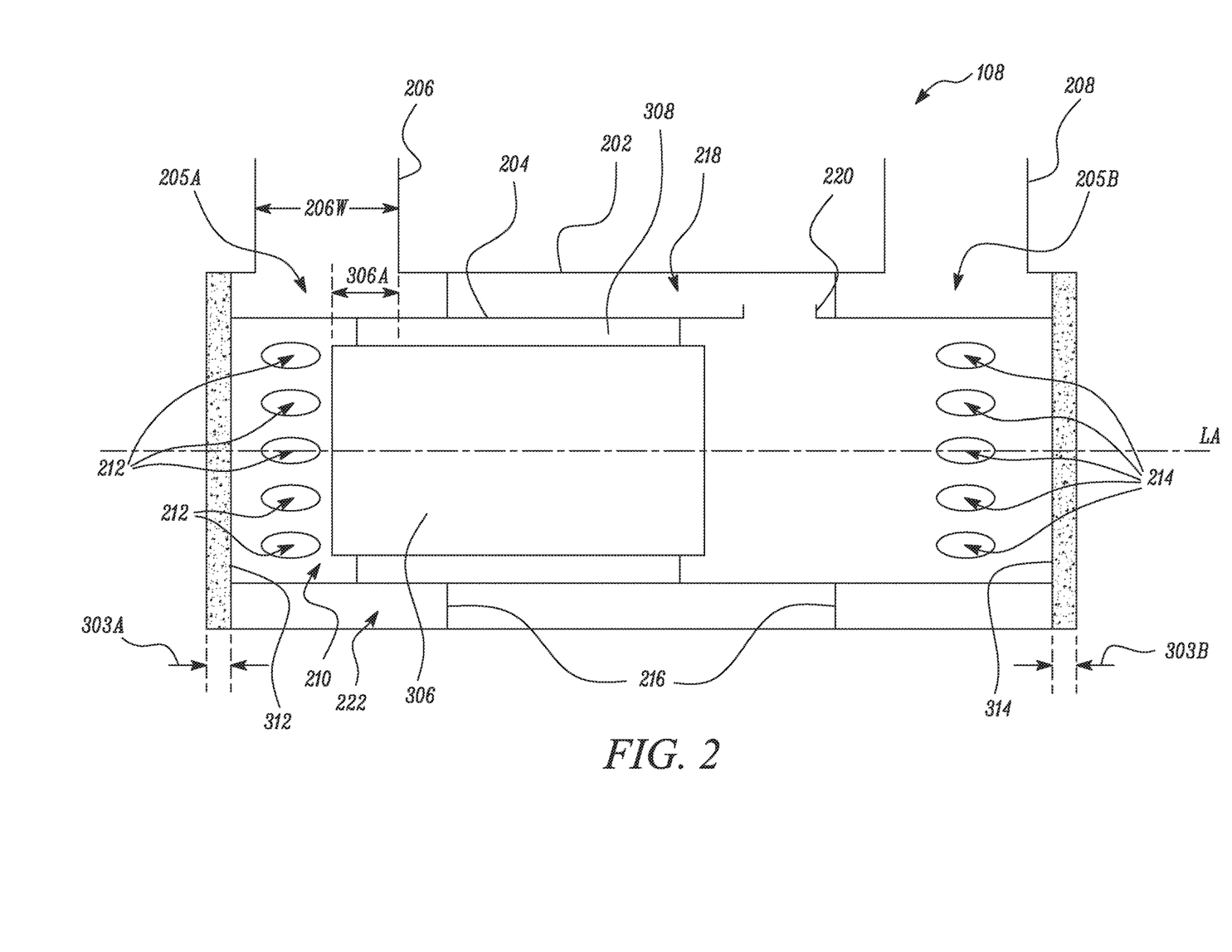
FIG. 2 is a schematic sectional view of an exhaust device of the vehicle exhaust system of FIG. 1, in accordance with an aspect of the disclosure.

FIG. 2 illustrates a schematic sectional view of the exhaust device 108 according to an embodiment of the present disclosure. The exhaust device 108 defines a longitudinal axis LA along its length. The exhaust device 108 includes an outer shell 202, an inner shell 204, an inlet 206 and an outlet 208. The inlet 206 extends from the outer shell 202 to receive exhaust gases from the engine 102 of FIG. 1. The outlet 208 also extends from the outer shell 202. The outlet 208 may be in fluid communication with the tailpipe 106. The inner shell 204 is received within the outer shell 202. The inlet 206 and the outlet 208 extends radially from the outer shell 202. Specifically, the inlet 206 and the outlet 208 extends radially relative to the longitudinal axis LA of the exhaust device 108. In the illustrated embodiment of FIG. 2, each of the inlet and outlet 206, 208 are hollow tubular components extending radially from the outer shell 202. Further, the outer shell 202 is a hollow tubular component extending along the longitudinal axis LA. The inlet 206 and the outlet 208 are axially spaced apart from each other relative to the longitudinal axis LA. In some embodiments, the exhaust device 108 may include multiple inlets (not shown) and/or multiple outlets (not shown).

The inner shell 204 defines an inner volume 210, a plurality of first circumferential openings 212 therethrough and a plurality of second circumferential openings 214 therethrough. The first circumferential openings 212 extend through the inner shell 204 and fluidly communicate the inlet 206 with the inner volume 210. The second circumferential openings 214 extend through the inner shell 204 and fluidly communicate the outlet 208 with the inner volume 210. The inner shell 204 has a hollow tubular shape extending along the longitudinal axis LA. The inner volume 210 is a volume defined by the hollow tubular shape of the inner shell 204. Further, the first and second circumferential openings 212, 214 are disposed along a circumference of the hollow tubular shape of the inner shell 204. The first and second circumferential openings 212, 214 are spaced apart from each other along the longitudinal axis LA. The first circumferential openings 212 are located proximal to the inlet 206, while the second circumferential openings 214 are located proximal to the outlet 208. Each of the first circumferential openings 212 may have any suitable shape, for example, elliptical, oval, circular, polygonal, or the like. Each of the second circumferential openings 214 may have any suitable shape, for example, elliptical, oval, circular, polygonal, or the like. The first circumferential openings 212 may be arranged in one or more rows on the circumference of the inner shell 204. Further, the second circumferential openings 214 may be arranged in one or more rows on the circumference of the inner shell 204. However, the first and second circumferential openings 212, 214 may be arranged in any suitable manner, for example, uniformly or non-uniformly.

The exhaust device 108 further includes a pair of partition walls 216. The partition walls 216 are disposed between the inner shell 204 and the outer shell 202. The pair of partition walls 216, the inner shell 204 and the outer shell 202 define a Helmholtz chamber 218 therebetween. The pair of partition walls 216 seal the Helmholtz chamber 218 from the inlet 206 and the outlet 208. A Helmholtz neck 220 is disposed on the inner shell 204 or one of the pair of partition walls 216. The Helmholtz neck 220 fluidly communicates the inner volume 210 with the Helmholtz chamber 218. In the illustrated embodiment, the Helmholtz neck 220 is disposed on the inner shell 204. Further, the Helmholtz neck 220 extends radially inwards into the Helmholtz chamber 218.

As shown in FIGS. 2-5, the inner shell 204 may be radially offset from the outer shell 202 by an annular gap 222. The annular gap 222 may or may not be substantially uniform between the inner shell 204 and the outer shell 202. Specifically, a radius of the outer shell 202 is greater than a radius of the inner shell 204. The annular gap 222 may be substantially equal to a difference between the radii of the outer and inner shell 202, 204. The annular gap 222 extends about the longitudinal axis LA. The components shown in FIGS. 2-6 may be designed with and without catalyst substrates depending on the performance requirements.

Each of the partition walls 216 may be disc-shaped. The partition wall 216 proximal to the inlet 206, the outer shell 202 and the inner shell 204 define an annular inlet chamber 205A that fluidly communicates the inlet 206 with the first circumferential openings 212. Further, the partition wall 216 proximal to the outlet 208, the outer shell 202 and the inner shell 204 define an annular outlet chamber 205B that fluidly communicates the outlet 208 with the second circumferential openings 214.

An axial length of the outer shell 202 is also greater than an axial length of the inner shell 204 relative to the longitudinal axis LA. A first axial gap 303A is disposed between the inner shell 204 and the outer shell 202 proximal to the inlet 206. Similarly, a second axial gap 303B is disposed between the inner shell 204 and the outer shell 202 proximal to the outlet 208. Each of the first axial gap 303A and the second axial gap 303B may have a length that is substantially equal to a diameter of the outer shell 202.

In some embodiments, the exhaust device 108 further includes at least one of a sound attenuating material, an insulating material and an air gap disposed between the inner shell 204 and the outer shell 202. Specifically, at least one of the sound attenuating material, the insulating material and the air gap is disposed in the first axial gap 303A and/or the second axial gap 303B. The sound attenuating material may include any commonly used sound absorbing material, such as fiberglass roving, steel wool or porous ceramic. The amount of sound attenuating material may vary in different regions of the first axial gap 303A and/or the second axial gap 303B.

In another embodiment, the Helmholtz chamber 218 may also include the sound attenuating material and/or the insulating material disposed in the axial length of the chamber 218 along the longitudinal axis LA.

In the present disclosure, the inner shell 204 and the outer shell 202 form a double shell exhaust device. Therefore, any problems associated with the forming of a seam lock may be eliminated in the exhaust device 108. Further, there may not be any difference in the thermal expansion between the inner shell 204 and the outer shell 202, which consequently provides an adequate noise performance. The disclosed exhaust device 108 may not add any unnecessary weight and cost in the overall manufacturing process.

The exhaust device 108 may function as both an aftertreatment component and an acoustic attenuation component, thereby providing a hybrid design. This can also help to tune backpressure performance and allow reduction in acoustic tuning volume.

Figure 3:
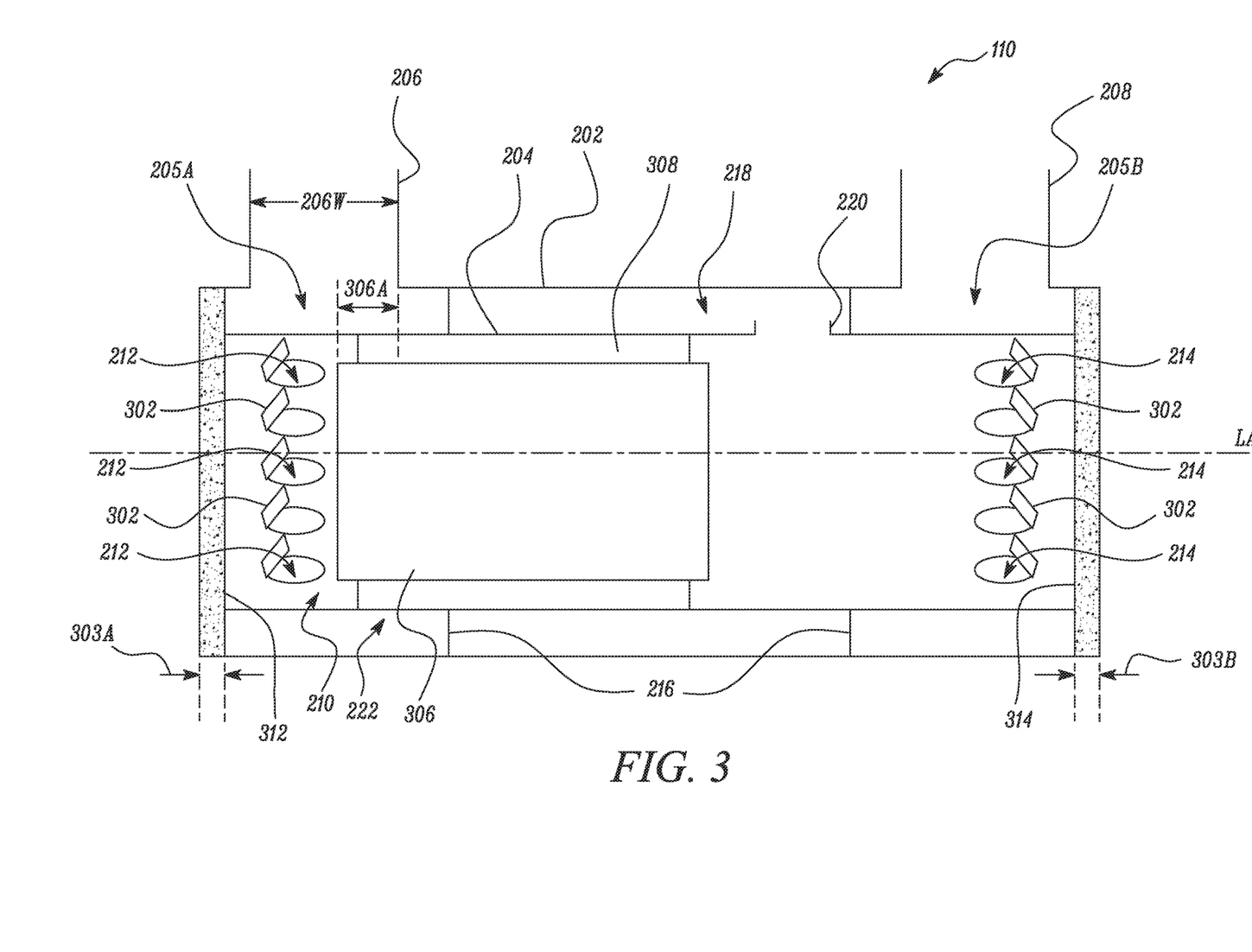
FIG. 3 is a schematic sectional view of an exhaust device of the vehicle exhaust system of FIG. 1, in accordance with an aspect of the disclosure.
Figure 4:
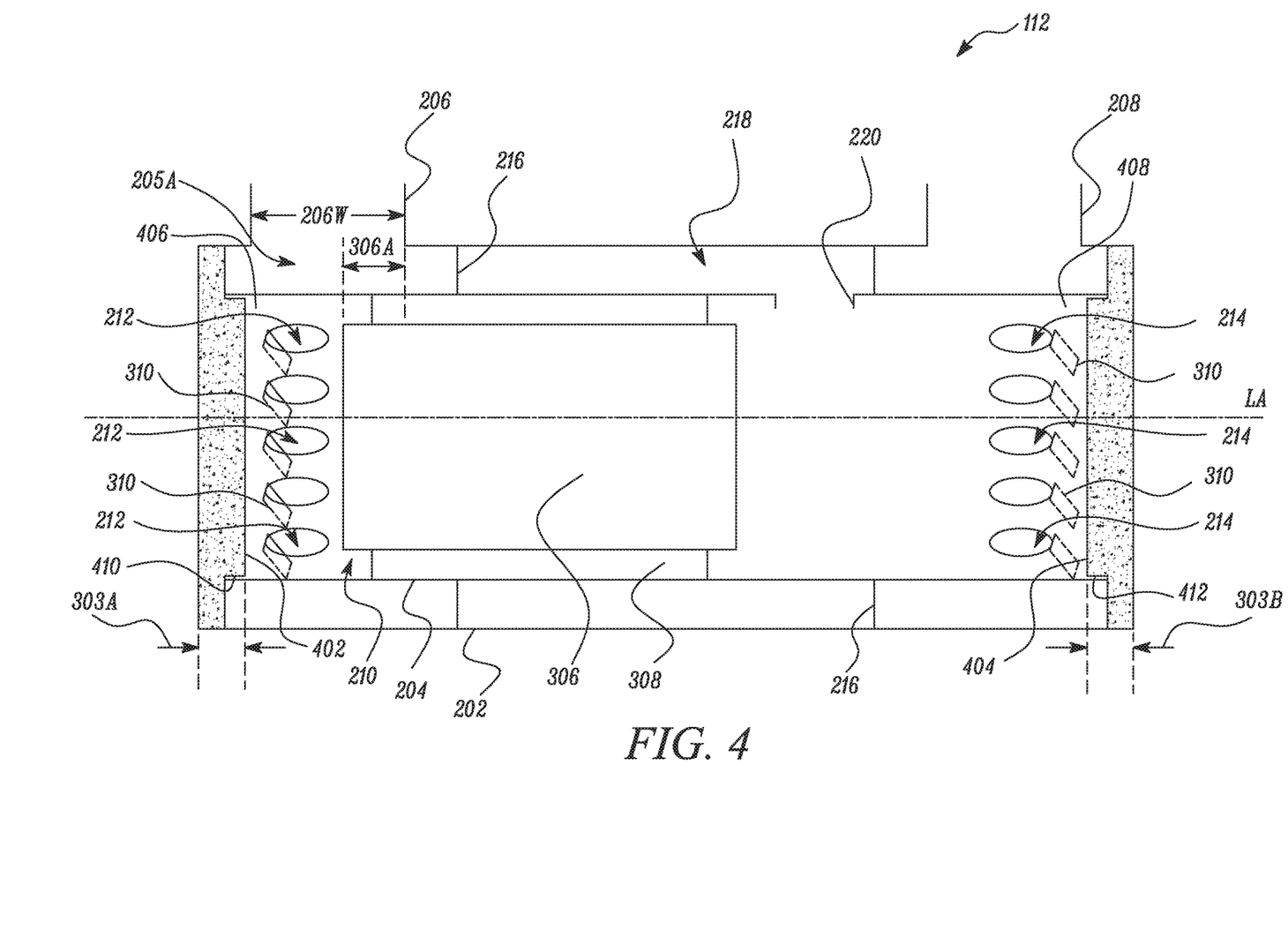
FIG. 4 is a schematic sectional view of an exhaust device of the vehicle exhaust system of FIG. 1, in accordance with an aspect of the disclosure.

FIGS. 3 and 4 illustrate sectional schematic views of exhaust devices 110 and 112 according to various embodiments of the present disclosure. The exhaust devices 110 and 112 are substantially similar in structure to the exhaust device 108. Similar components have been provided with the same reference numerals. However, as shown in FIG. 3, the exhaust device 110 includes a plurality of flaps or louvers 302 corresponding to the plurality of first circumferential openings 212 and the plurality of second circumferential openings 214. The flaps 302 extend from the inner shell 204. Each flap 302 is at least partially received within a corresponding first circumferential opening 212 of the plurality of first circumferential openings 212 and a corresponding second circumferential opening 214 of the plurality of second circumferential openings 214. In the illustrated embodiment of FIG. 3, the flaps 302 extend away from the inner volume 210. In other words, the flaps 302 are external flaps. Each flap 302 may have a suitable shape, for example, rectangular, polygonal, curvilinear, and so forth. Each flap 302 is inclined at an angle relative to the corresponding first circumferential opening 212 or the second circumferential opening 214. The flaps 302 associated with the first circumferential openings 212 may facilitate flow of gases from the annular inlet chamber 205A through the first circumferential openings 212 into the inner volume 210. The flaps 302 associated with the second circumferential openings 214 may facilitate flow of gases from the inner volume 210 through the second circumferential openings 214 into the annular outlet chamber 205B. In some embodiments, only the first circumferential openings 212 are provided with the flaps 302.

As shown in FIG. 4, the exhaust device 112 includes a plurality of flaps or louvers 310 corresponding to the plurality of first circumferential openings 212 and the plurality of second circumferential openings 214. The flaps 310 extend from the inner shell 204. Each flap 310 is at least partially received within a corresponding first circumferential opening 212 of the plurality of first circumferential openings 212 and a corresponding second circumferential opening 214 of the plurality of second circumferential openings 214. In the illustrated embodiment of FIG. 4, the flaps 310 extend towards the inner volume 210. In other words, the flaps 310 are internal flaps. Each flap 310 is inclined at an angle relative to the corresponding first circumferential opening 212 or the second circumferential opening 214. In some embodiments, only the first circumferential openings 212 are provided with the flaps 310. A combination of the flaps 302 of FIG. 3 and the flaps 310 of FIG. 4 may also be provided in an exhaust device of the present disclosure. Specifically, an exhaust device may include both external and internal flaps.

Referring to FIGS. 2 to 4, each of the exhaust devices 108, 110 and 112 also includes a catalyst substrate 306 and a mat 308. The catalyst substrate 306 is received within the inner volume 210 of the inner shell 204. The catalyst substrate 306 is axially disposed between the plurality of first circumferential openings 212 and the plurality of second circumferential openings 214. Specifically, the catalyst substrate 306 is axially disposed between the first and second circumferential openings 212, 214 relative to the longitudinal axis LA. The mat 308 supports the catalyst substrate 306 and is disposed between the catalyst substrate 306 and the inner shell 204. Specifically, the mat 308 supports the catalyst substrate 306 on the inner shell 204. The catalyst substrate 306 may be a diesel oxidation catalyst (DOC), a selective reduction catalyst (SCR), or any other catalyst material used for exhaust treatment.

Referring to FIGS. 2 to 4, the inlet 206 defines an inlet width 206W shown in FIG. 3. A portion 306A of the catalyst substrate 306 is axially disposed within the inlet width 206W. Specifically, the portion 306A is axially disposed within the inlet width 206W relative to the longitudinal axis LA. Further, the plurality of first circumferential openings 212 is axially disposed within the inlet width 206W. Therefore, the first circumferential openings 212 and the portion 306A of the catalyst substrate 306 are both axially disposed within the inlet width 206W of the inlet 206, but radially spaced apart from the inlet 206. This may result in a compact configuration/packaging of the exhaust devices 108, 110, 112 in the vehicle exhaust system 100 of FIG. 1.

The axial disposition of the first circumferential openings 212 within the inlet width 206W may provide adequate mixing of exhaust gases upstream of the catalyst substrate 306. The axial disposition of the first circumferential openings 212 within the inlet width 206W may not increase the overall length of the exhaust device 108. Thus, the disclosed exhaust devices 108, 110, 112 may not impose any problem related to packaging.

Referring to FIGS. 2 and 3, each of the exhaust devices 108 and 110 further includes a first end cap 312 and a second end cap 314. The first end cap 312 axially seals the inner volume 210 proximal to the inlet 206. The second end cap 314 axially seals the inner volume 210 proximal to the outlet 208. The first end and second end caps 312, 314 may be separate components or integral with the inner shell 204. The first and second end caps 312, 314 may be connected to the outer shell 202.

Referring to FIG. 4, the exhaust device 112 further includes a first end cap 402 and a second end cap 404. Each of the first and second end caps 402, 404 may be substantially disc-shaped. The first end cap 402 seals the inner volume 210 at a first axial end 406 of the inner shell 204. The first axial end 406 is disposed proximal to the inlet 206. Further, the first axial end 406 seals the inner volume 210 from the annular axial gap 303A. The second end cap 404 seals the inner volume at a second axial end 408 of the inner shell 204. The second axial end 408 is disposed proximal to the outlet 208. Further, the second axial end 408 seals the inner volume 210 from the annular axial gap 303B. The first end cap 402 is connected to the outer shell 202. In some embodiments, the first end cap 402 may be connected to the outer shell 202 by welding, brazing, adhesives, or combinations thereof. The first end cap 402 includes a shoulder 410 supporting the inner shell 204. The shoulder 410 may be an annular projection extending axially towards the inner volume 210. The second end cap 404 is connected to the outer shell 202. In some embodiments, the second end cap 404 may be connected to the outer shell 202 by welding, brazing, adhesives, or combinations thereof. The second end cap 404 also includes a shoulder 412 to support the inner shell 204. The shoulder 412 may be an annular projection extending axially towards the inner volume 210.

In an alternate embodiment, the end caps 402, 404 of the inner shell 204 may also act as the partition walls of the exhaust device 112. Specifically, the end cap 402 may replace the partition wall 216 located proximal to the inlet 206. Similarly, the end cap 404 may replace the partition wall 216 located proximal to the outlet 208. In another embodiment, the inner shell 204 may be designed at one of its ends to form an integral partition wall. For example, the partition wall 216 proximal to the inlet 206 may be integrally formed with the inner shell 204.

Referring to FIGS. 2-4, the Helmholtz chamber 218 is in fluid communication with the inner volume 210 through the Helmholtz neck 220. The Helmholtz chamber 218 is used to attenuate a desired frequency and/or limited range of frequencies during operation of the vehicle exhaust system 100 (not shown in FIG. 1). It should be noted that the attenuated frequency ranges can be changed by changing the dimensions (for example, length, diameter, width etc.) of the Helmholtz neck 220 and the Helmholtz chamber 218. The frequencies attenuated can also be modified by varying the number and location of the Helmholtz neck 220. Examples of different Helmholtz necks will be described hereinafter with reference to FIG. 6.

Figure 5A:
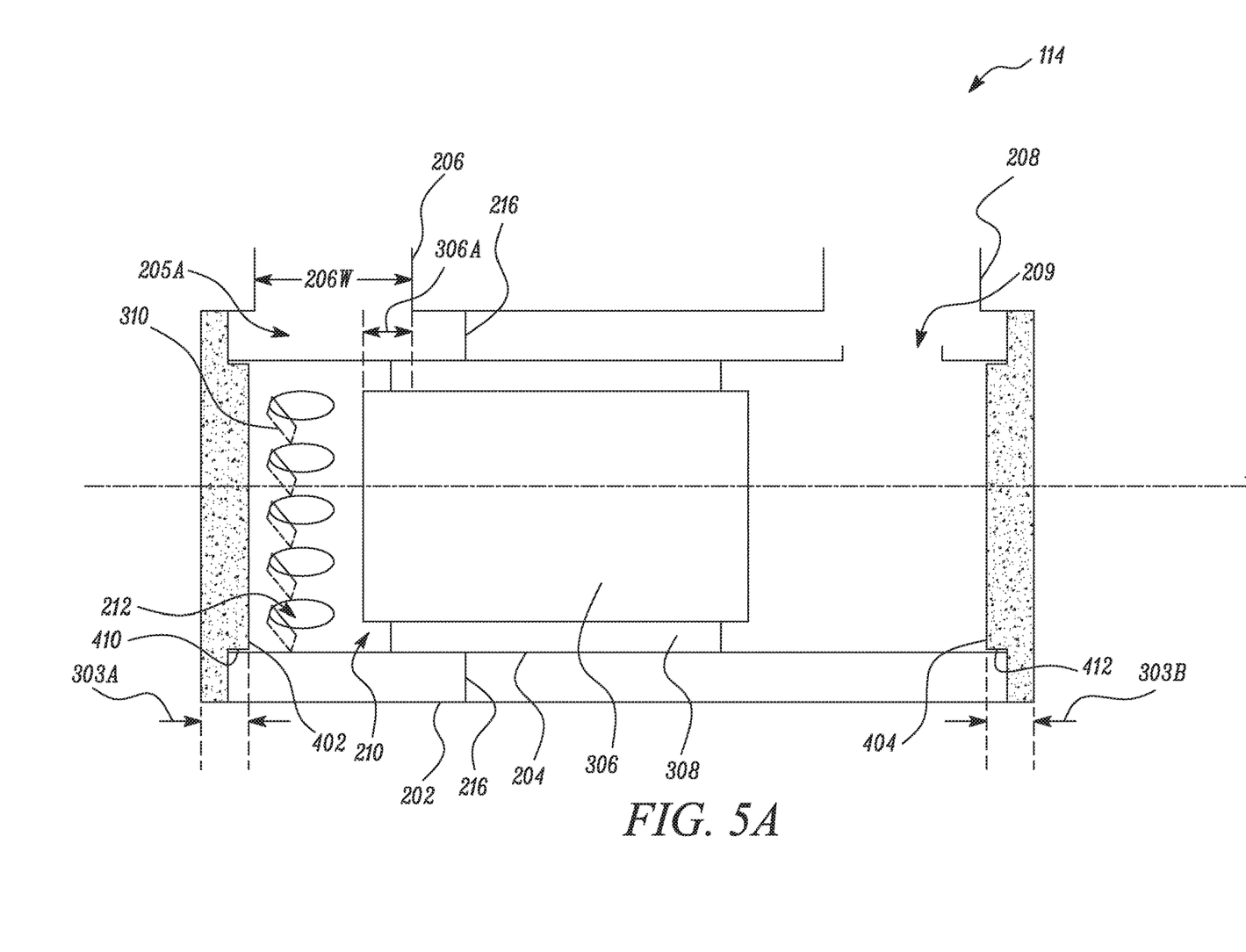
FIG. 5A is a schematic sectional view of an exhaust device of the vehicle exhaust system of FIG. 1, in accordance with an aspect of the disclosure.

With reference to FIG. 5A, another embodiment of an exhaust device 114 is described. Similar components have been provided with the same reference numerals. The exhaust device 114 is substantially similar to the exhaust device 108 of FIG. 2. However, the exhaust device 114 does not include a Helmholtz chamber and a Helmholtz neck. Further, the exhaust device 114 only includes one partition wall 216 proximal to the inlet 206 and sealing the annular inlet chamber 205A from the outlet 208. The inner shell 204 further includes a single outlet opening 209 disposed in fluid communication with the radial outlet 208. The outlet opening 209 is also radial. Similarly, the annular inlet chamber 205A is disposed in fluid communication with the radial inlet 206.

The exhaust device 114 includes the plurality of first circumferential openings 212 and the single outlet opening 209. However, in other embodiments, the exhaust device 114 may include at least one first opening disposed in fluid communication with the inlet 206. Further, the exhaust device 114 may include one or more second openings disposed in fluid communication with the outlet 208.

Figure 5B:
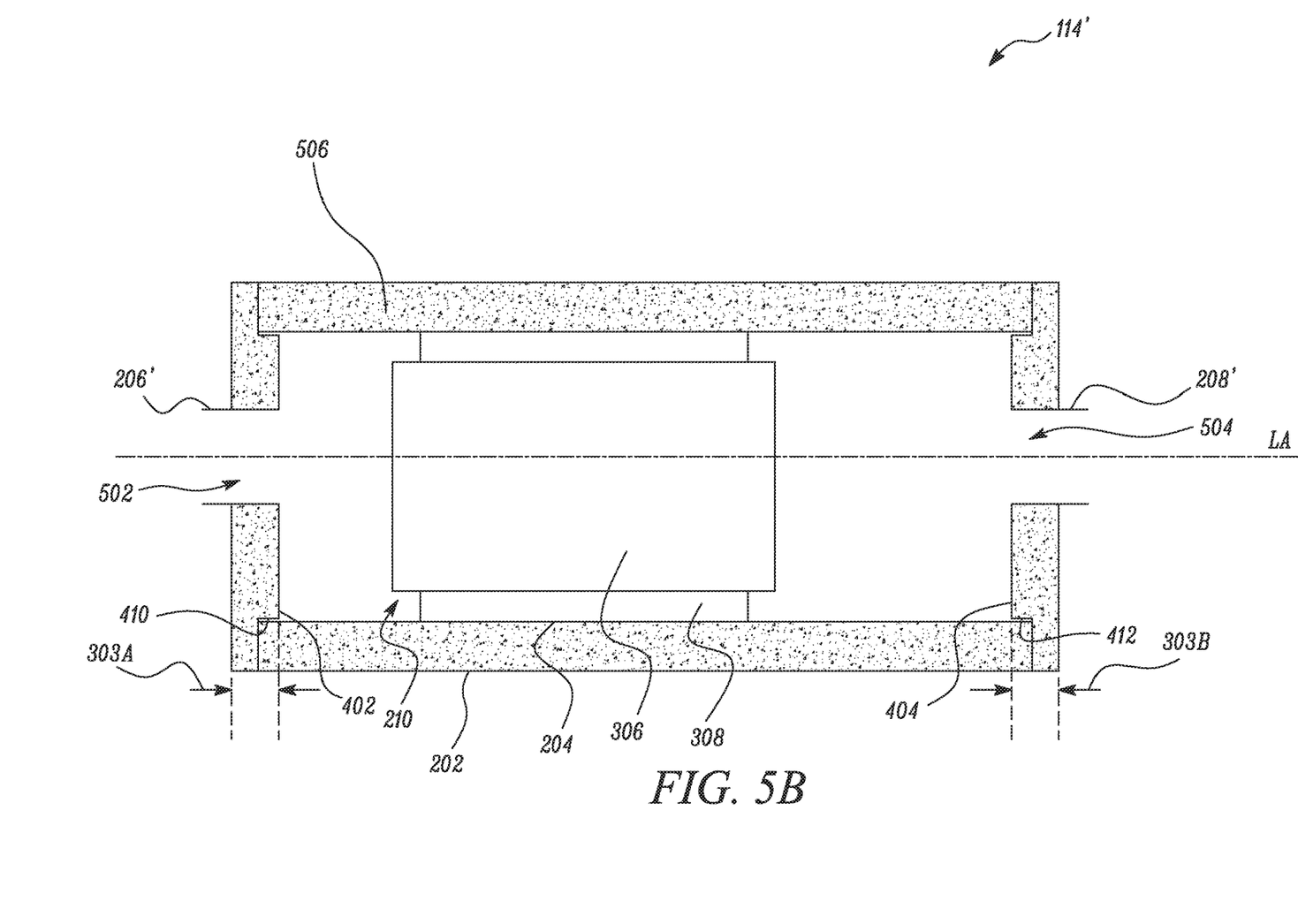
FIG. 5B is a schematic sectional view of an exhaust device of the vehicle exhaust system of FIG. 1, in accordance with an aspect of the disclosure.

With reference to FIG. 5B, another embodiment of an exhaust device 114' is described. Similar components have been provided with the same reference numerals. The exhaust device 114' is substantially similar to the exhaust device 114 of FIG. 5A. However, the exhaust device 114' does not include any circumferential openings on the inner shell 204. Further, the exhaust device 114' includes an inlet 206' and an outlet 208' that extend axially from the outer shell 202. Specifically, each of the inlet 206' and the outlet 208' extends along the longitudinal axis LA. The exhaust device 114' further includes an axial inlet opening 502 and an axial outlet opening 504. Specifically, the inner shell 204 defines the axial inlet opening 502 therethrough. The inner shell 204 further defines the axial outlet opening 504 therethrough. The axial inlet opening 502 is in fluid communication with the inlet 206'. The axial outlet opening 504 is in fluid communication with the outlet 208'. The catalyst substrate 306 is disposed between the axial inlet opening 502 and the axial outlet opening 504.

As shown in FIG. 5B, the exhaust device 114' further includes an annular chamber 506 disposed between the outer shell 202 and the inner shell 204. The annular chamber 506 extends axially along the longitudinal axis LA. The annular chamber 506 may be filled with a sound attenuating material and/or an insulating material. The annular chamber 506 may also be designed for acoustics attenuation for a certain emitted frequency range. The area and size of the annular chamber 506 may be modified for a given exhaust system to help reduce emitted sound for the exhaust device 114'.

With reference to FIGS. 5A and 5B, each of the exhaust devices 114, 114' may include any combination of the axial inlet 206', the radial inlet 206, the radial outlet 208 and the radial outlet 208'. For example, the exhaust device 114 may include an axial inlet or an axial outlet. The exhaust device 114' may include a radial inlet or a radial outlet.

Figure 6:
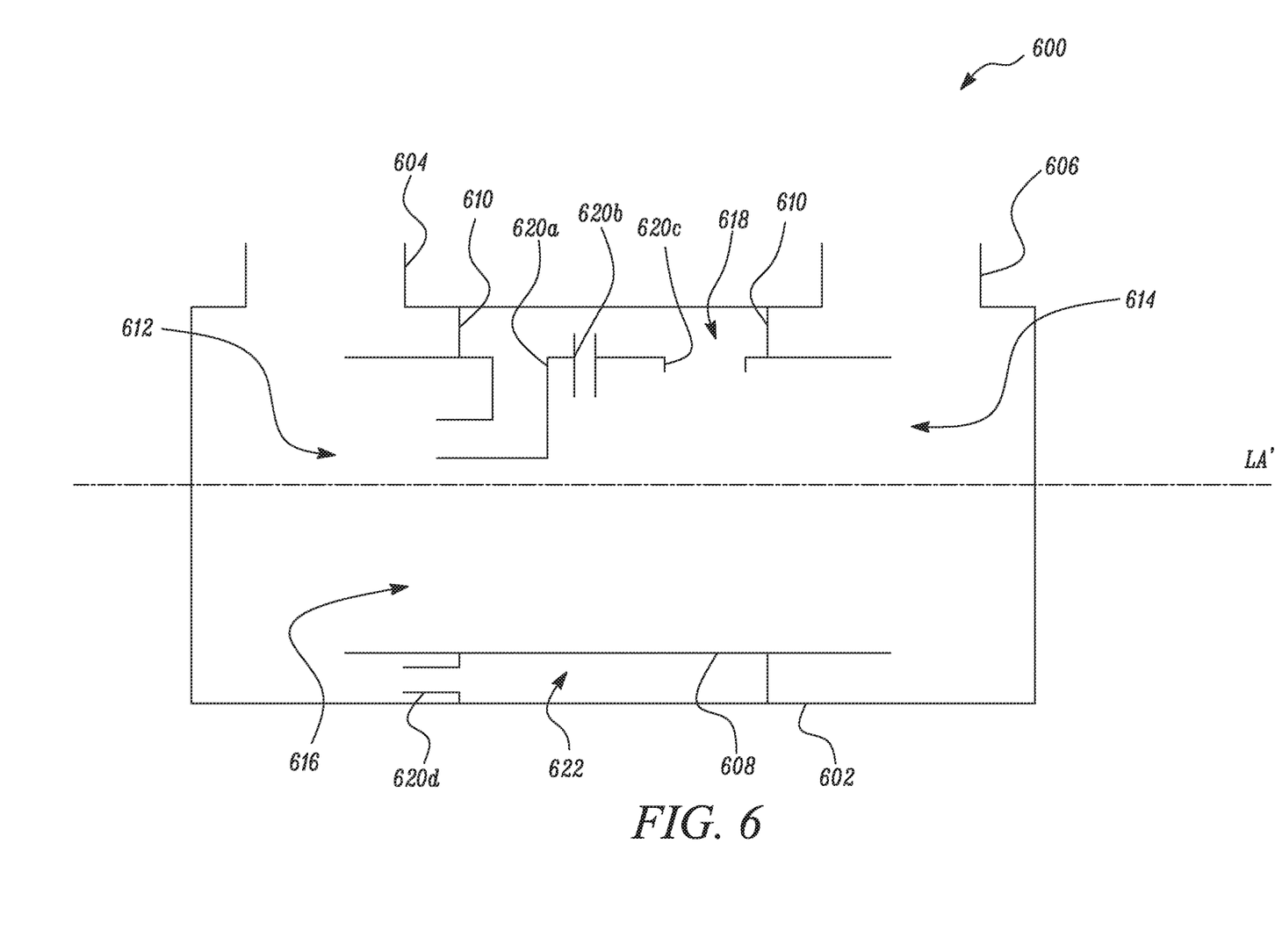
FIG. 6 is a schematic sectional view of an exhaust device of the vehicle exhaust system of FIG. 1, in accordance with an aspect of the disclosure.

FIG. 6 illustrates a sectional schematic view of an exhaust device 600 according to another embodiment of the present disclosure. The exhaust device 600 includes an outer shell 602, an inlet 604 extending from the outer shell 602 and receiving exhaust, an outlet 606 extending from the outer shell 602, an inner shell 608 received within the outer shell 602, and a pair of partition walls 610. The exhaust device 600 further defines a longitudinal axis LA' along its length. In another embodiment, the exhaust device 600 may include one or more catalyst substrates for emission performance of the exhaust gases.

The inner shell 608 of the exhaust device 600 defines a first opening 612 and a second opening 614 opposite to the first opening 612. In the illustrated embodiments, each of the first opening 612 and the second opening 614 is an axial opening. The first and second openings 612, 614 are spaced apart from each other with respect to the longitudinal axis LA'. The first opening 612 is disposed in fluid communication with the inlet 604. The second opening 614 is disposed in fluid communication with the outlet 606. The inner shell 608 further defines an inner volume 616 extending between the first opening 612 and the second opening 614.

The inner shell 608 and the outer shell 602 define a Helmholtz chamber 618 therebetween. The partition walls 610 seal the Helmholtz chamber 618 from the inlet 604 and the outlet 606. The exhaust device 600 further includes multiple Helmholtz necks 620a, 620b, 620c and 620d that fluidly communicate the inner volume 616 with the Helmholtz chamber 618. In some embodiments, lengths and diameters of the Helmholtz necks 620a, 620b, 620c and 620d may be different. In some embodiments, the Helmholtz necks 620a, 620b, 620c, 620d may have different shapes, for example, linear, curvilinear etc. The positions of the Helmholtz necks 620a, 620b, 620c and 620d may also vary, for example one or more Helmholtz necks 620 may be disposed on the partition walls 610.

The inner shell 608 is radially offset from the outer shell 602 by an annular gap 622. The annular gap 622 may or may not be uniform along the longitudinal axis LA'. Further, each of the inlet 604 and the outlet 606 extends radially from the outer shell 602.

Figure 7:
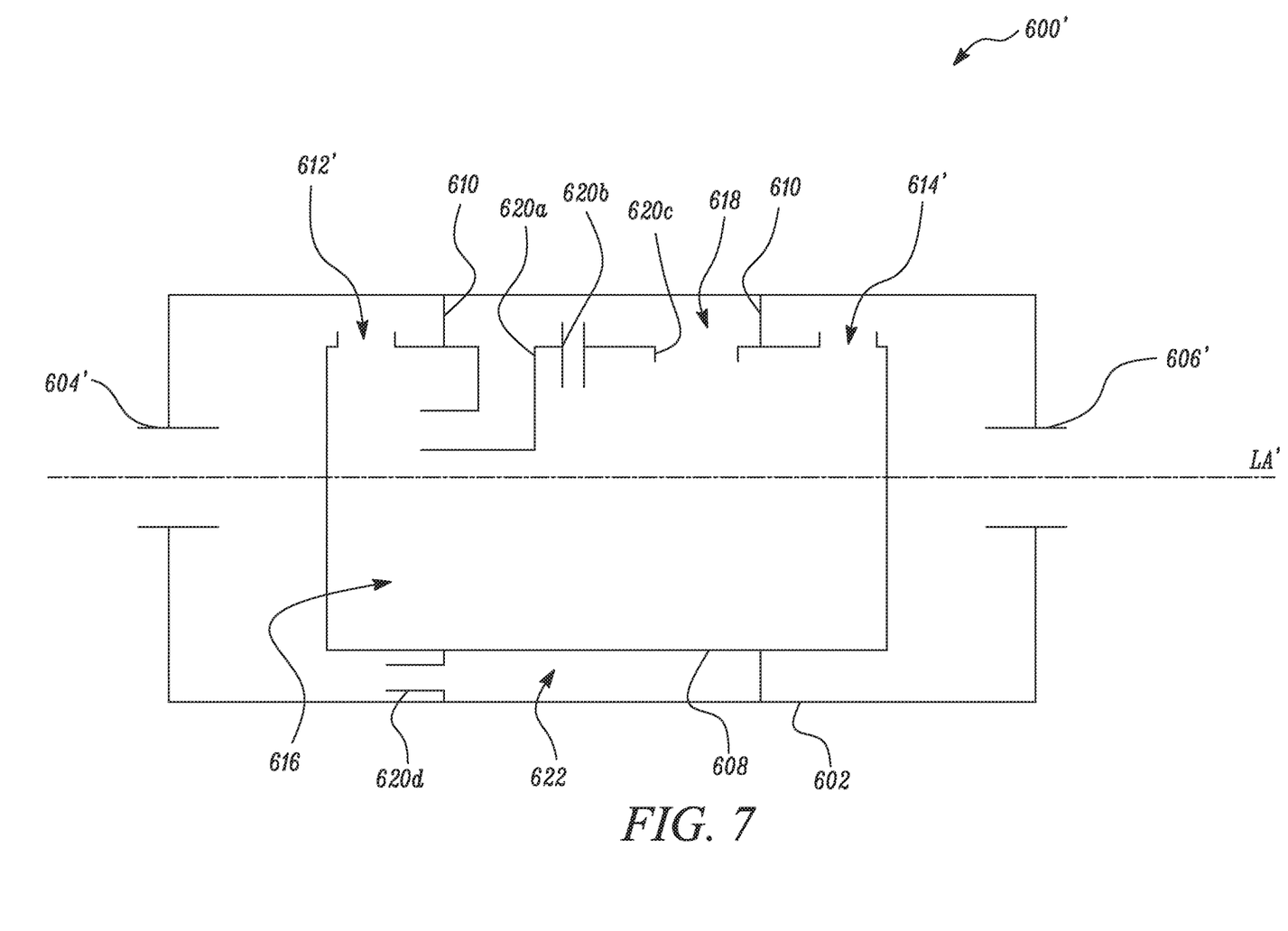
FIG. 7 is a schematic sectional view of an exhaust device of the vehicle exhaust system of FIG. 1, in accordance with an aspect of the disclosure.

FIG. 7 illustrates a sectional schematic view of an exhaust device 600' according to an embodiment of the present disclosure. The exhaust device 600' is substantially similar in structure to the exhaust device 600 of FIG. 6. Similar components have been provided with the same reference numerals. However, the exhaust device 600' includes an inlet 604' and an outlet 606' that extend axially from the outer shell 602. Specifically, each of the inlet 604' and the outlet 606' extend along the longitudinal axis LA'. In another embodiment with reference to FIGS. 6 and 7, the exhaust device (600, 600') may include an axial inlet and a radial outlet, and vice versa. Further, the inner shell 608 includes first opening 612' and a second opening 614'. Each of the first opening 612' and the second opening 614' is a radial opening.

With reference to FIGS. 6 and 7, each of the exhaust devices 600, 600 may include any combination of the first openings 612, 612' and the second opening 614, 614'. For example, the exhaust device 600 may include a radial first opening or a radial second opening. The exhaust device 600' may include an axial first opening or an axial second opening.

Figure 8:
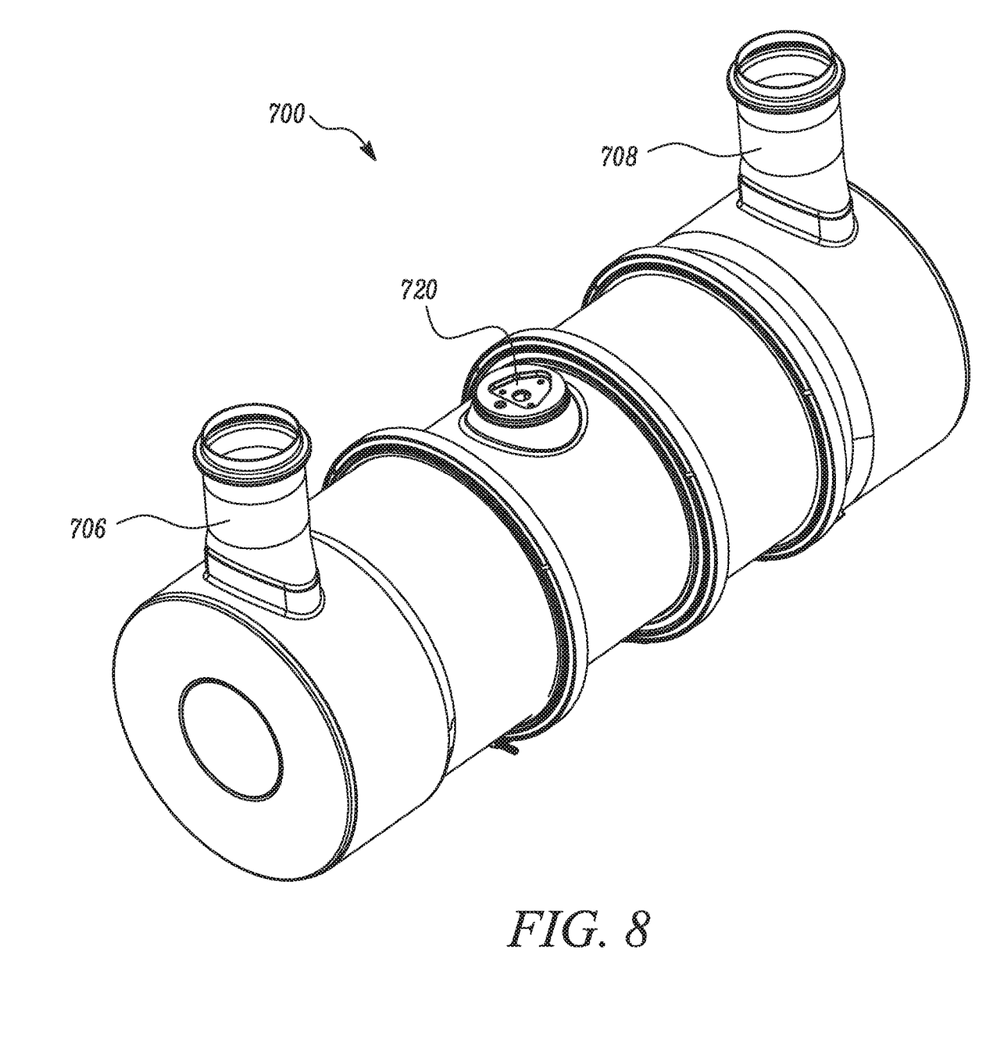
FIG. 8 is a perspective view of an exhaust device of the vehicle exhaust system of FIG. 1, in accordance with an aspect of the disclosure.
Figure 9:
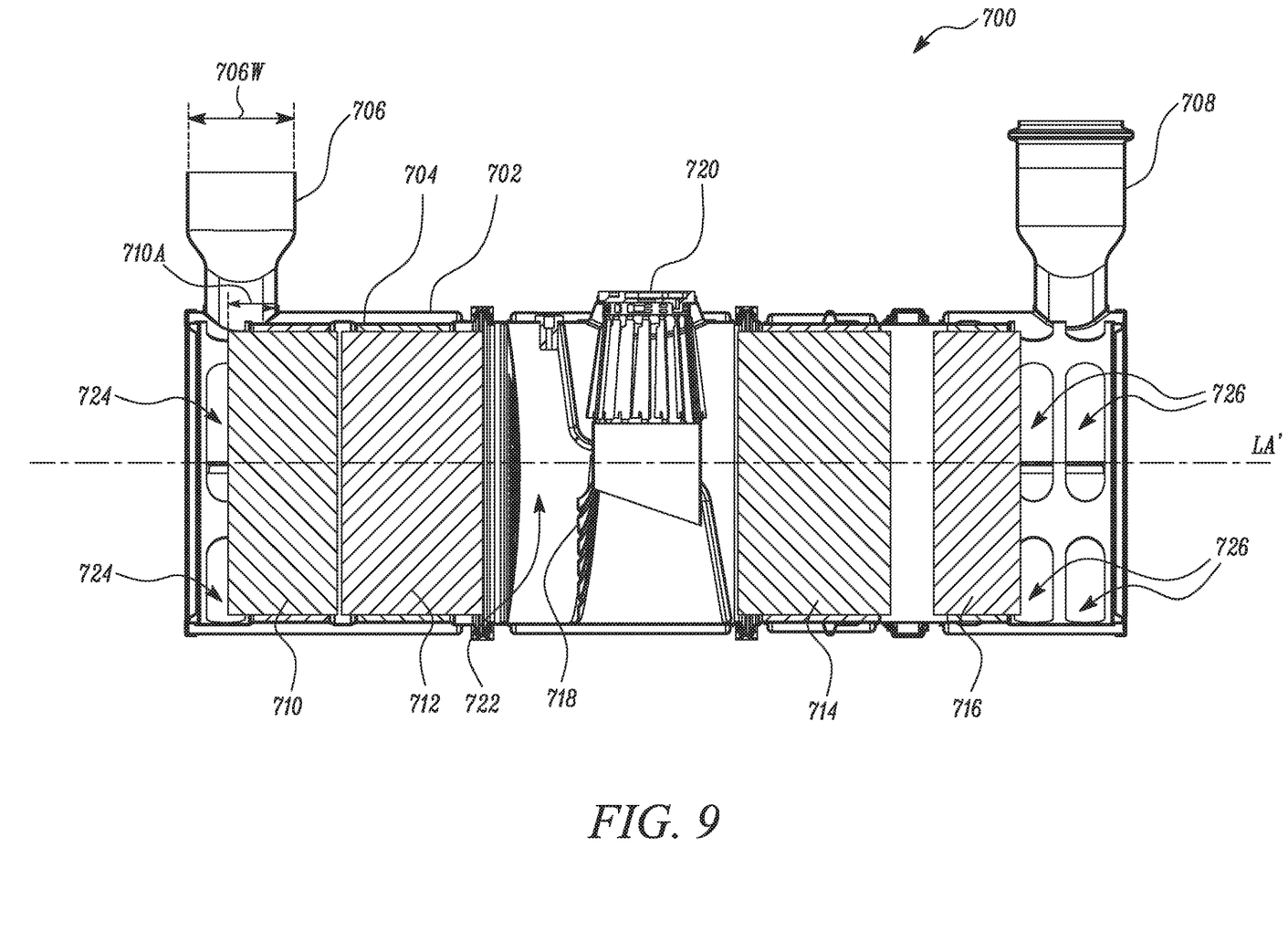
FIG. 9 is a sectional view of the exhaust device of FIG. 8.

FIG. 8 is a perspective view of an exhaust device 700. FIG. 9 illustrates a sectional view of the exhaust device 700. Referring to FIGS. 8 and 9, the exhaust device 700 includes an outer shell 702, an inner shell 704, an inlet 706, the outlet 708, catalyst substrates 710, 712, 714, 716, a mixing plate 718 and an injector mount 720. The catalyst substrate 710 may be a diesel oxidation catalyst (DOC). The catalyst substrate 712 may be a diesel particulate filter (DPF). The catalyst substrate 714 may be a selective reduction catalyst (SCR). The catalyst substrate 716 may be an ammonia ($NH_3$) catalyst. The injector mount 720 provides a position for mounting of an injector to inject urea solution or ammonia solution into an inner volume 722 upstream of the catalyst substrate 714. The mixing plate 718 may provide adequate mixing of exhaust gases and urea solution for improved reduction of exhaust gases in the catalyst substrate 714.

Figure 10:
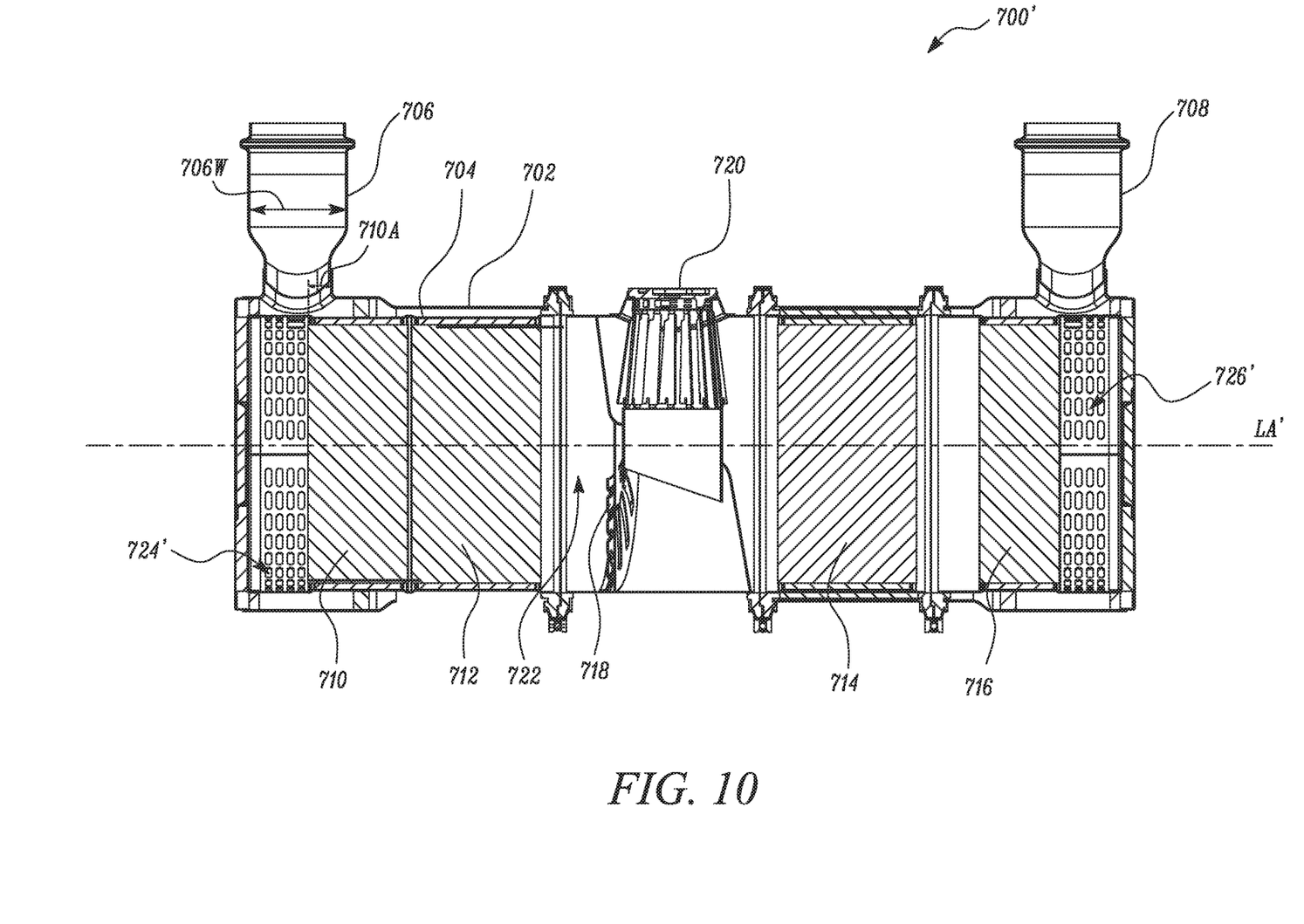
FIG. 10 is a sectional view of an exhaust device of the vehicle exhaust system of FIG. 1, in accordance with an aspect of the disclosure.

The inner shell 704 includes a plurality of first circumferential openings 724 within an inlet width 706W defined by the inlet 706. A portion 710A of the catalyst substrate 710 is also axially disposed within the inlet width 706W. The inner shell 704 also includes the plurality of second circumferential openings 726. In the illustrated embodiment of FIG. 9, each of the first and second circumferential openings 724, 726 is in the form of cutouts or slots. FIG. 10 illustrates an exhaust device 700' that is substantially similar to the exhaust device 700. However, a plurality of first circumferential openings 724' and a plurality of second circumferential openings 726' of the exhaust device 700' have a different design. As shown in FIG. 10, each of the first circumferential openings 724' and the second circumferential openings 726' is in the form of perforations. The shape and dimensions of the first and second circumferential openings may change depending on the requirements of the vehicle exhaust system 100.

Figure 11:
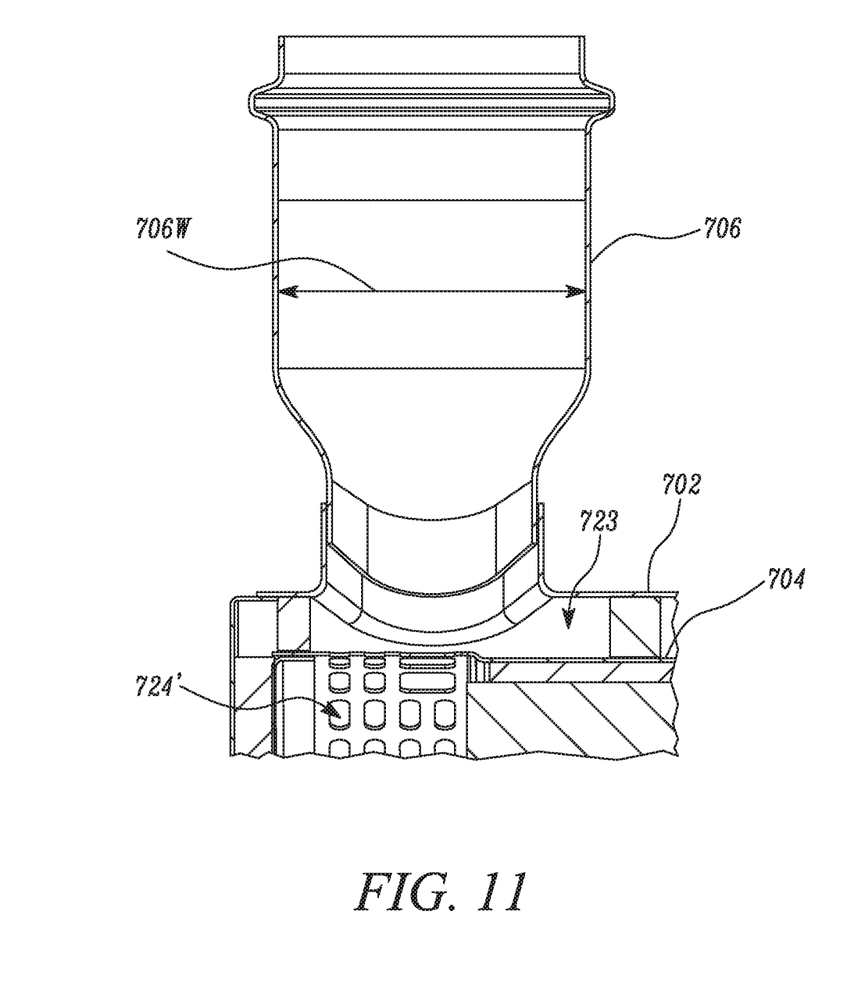
FIG. 11 is a close-up sectional view of the inlet of the exhaust device of FIG. 10.

FIG. 11 illustrates a close-up sectional view of the inlet 706, the inner shell 704 and the outer shell 702 of the exhaust system 700'. The exhaust device 700' includes an annular gap 723 between the outer shell 702 and the inner shell 704. Further, the figure clearly shows the first circumferential openings or perforations 724' provided on the inner shell 704.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. An exhaust device comprising:
    an outer shell;
    an inlet extending from the outer shell and receiving exhaust gas;
    an outlet extending from the outer shell;
    an inner shell received within the outer shell, the inner shell defining an inner volume, a plurality of first circumferential openings therethrough fluidly communicating the inlet with the inner volume, and a plurality of second circumferential openings therethrough fluidly communicating the outlet with the inner volume;
    a pair of partition walls disposed between the inner shell and the outer shell, wherein the pair of partition walls, the inner shell and the outer shell define a Helmholtz chamber therebetween, wherein the pair of partition walls seal the Helmholtz chamber from the inlet and the outlet; and
    a Helmholtz neck comprising a cylindrical wall defining a tube disposed on the inner shell, the Helmholtz neck comprising an elbow having a first end extending axially within the inner shell and a second end extending radially toward the Helmholtz chamber, the Helmholtz neck fluidly communicating the inner volume with the Helmholtz chamber;
    wherein the inner shell is radially offset from the outer shell by an annular gap.

2. The exhaust device of claim 1, further comprising a plurality of flaps corresponding to the plurality of first circumferential openings and extending from the inner shell, wherein each flap is at least partially received within a corresponding first circumferential opening of the plurality of first circumferential openings.

3. The exhaust device of claim 2, wherein each flap extends towards the inner volume.

4. The exhaust device of claim 2, wherein each flap extends away from the inner volume.

5. The exhaust device of claim 1, further comprising:
a catalyst substrate received within the inner volume of the inner shell, wherein the catalyst substrate is axially disposed between the plurality of first circumferential openings and the plurality of second circumferential openings; and
a mat disposed between the catalyst substrate and the inner shell and supporting the catalyst substrate.

6. The exhaust device of claim 5, wherein the inlet defines an inlet width, and wherein at least a portion of the catalyst substrate is axially disposed within the inlet width.

7. The exhaust device of claim 6, wherein the plurality of first circumferential openings is axially disposed within the inlet width.

8. The exhaust device of claim 1, further comprising:
a first end cap sealing the inner volume at a first axial end of the inner shell; and
a second end cap sealing the inner volume at a second axial end of the inner shell.

9. The exhaust device of claim 8, wherein the first end cap is connected to the outer shell and comprises a shoulder supporting the inner shell.

10. The exhaust device of claim 8, wherein the second end cap is connected to the outer shell and comprises a shoulder supporting the inner shell.

11. The exhaust device of claim 1, further comprising at least one of a sound attenuating material, an air gap and an insulating material disposed between the inner shell and the outer shell.

12. The exhaust device of claim 1, wherein the annular gap between the inner shell and the outer shell is substantially uniform.

13. An exhaust device comprising:
an outer shell;
an inlet extending from the outer shell and receiving exhaust gas;
an outlet extending from the outer shell;
an inner shell received within the outer shell, the inner shell defining a first opening disposed in fluid communication with the inlet, a second opening disposed in fluid communication with the outlet, and an inner volume extending between the first opening and the second opening;
a pair of partition walls disposed between the inner shell and the outer shell, wherein the pair of partition walls, the inner shell and the outer shell define a Helmholtz chamber therebetween, wherein the pair of partition walls seal the Helmholtz chamber from the inlet and the outlet; and
at least a first Helmholtz neck comprising a cylindrical wall defining a tube disposed on the inner shell and extending radially inward into the Helmholtz chamber, the Helmholtz neck fluidly communicating the inner volume with the Helmholtz chamber;
at least a second Helmholtz neck comprising a cylindrical wall defining a tube disposed on one of the pairs of partition walls and extending axially from the Helmholtz chamber;
wherein the inner shell is radially offset from the outer shell by an annular gap.

14. The exhaust device of claim 13, wherein each of the inlet and the outlet extends radially from the outer shell.

15. The exhaust device of claim 13, wherein each of the inlet and the outlet extends axially from the outer shell.

16. The exhaust device of claim 13, wherein at least one of the first opening and the second opening of the inner shell is an axial opening.

17. The exhaust device of claim 13, wherein at least one of the first opening and the second opening of the inner shell is a radial opening.

* * * * *